United States Patent
Pan et al.

(10) Patent No.: US 10,371,583 B1
(45) Date of Patent: Aug. 6, 2019

(54) SYSTEMS AND METHODS FOR ESTIMATING TEMPERATURES OF WIRES IN AN INTEGRATED CIRCUIT CHIP

(71) Applicant: Ansys, Inc., Canonsburg, PA (US)

(72) Inventors: Hsiming Stephen Pan, San Jose, CA (US); Norman Chang, Fremont, CA (US)

(73) Assignee: Ansys, Inc., Canonsburg, PA (US)

( * ) Notice: Subject to any disclaimer, the term of this patent is extended or adjusted under 35 U.S.C. 154(b) by 641 days.

(21) Appl. No.: 14/938,435

(22) Filed: Nov. 11, 2015

Related U.S. Application Data

(60) Provisional application No. 62/078,075, filed on Nov. 11, 2014.

(51) Int. Cl.
*G01K 7/42* (2006.01)
(52) U.S. Cl.
CPC ..................... *G01K 7/42* (2013.01)
(58) Field of Classification Search
None
See application file for complete search history.

(56) References Cited

U.S. PATENT DOCUMENTS

| | | | | |
|---|---|---|---|---|
| 2005/0161822 A1* | 7/2005 | Ohkubo | ................. | G01K 7/015 257/758 |
| 2014/0059325 A1* | 2/2014 | Morimoto | ........... | G06F 12/0893 712/42 |

OTHER PUBLICATIONS

C. Sauriol Rev. Jan. 27, 2003 © Heat Sinks, 19 page.*
Wei Huang in HotSpot—A Chip and Package Compact Thermal Modeling Methodology for VLSI Design, Jan. 2007 196 pages.*
Thermal Analysis of Semiconductor Systems, printed on Janurary 2018, 24 pages.*
C. M. Jha in High resolution microresonator-based digital temperature sensor, © 2007 American Institute of Physics, 4 pages.*
Thu Huynh in Fundamentals of Thermal Sensors, © Springer Science+Business Media New York 2015, 39 pages.*
Pan, Stephen, Chang, Norman, Ma, Mark Qi, Shankaran, Gokul, Nagulapally, Manoj; Thermal Co-Analysis of 3D-IC/Packages/System; DesignCon 2013.

(Continued)

*Primary Examiner* — Tung S Lau
(74) *Attorney, Agent, or Firm* — Jones Day

(57) ABSTRACT

Systems and methods are provided for estimating a temperature of a wire of an integrated circuit (IC) chip having a plurality of heat-generating components. For each of the heat-generating components, a temperature of the heat-generating component is computed. For each of the heat-generating components, a decay profile defining a thermal coupling from the heat-generating component to wires of the IC chip is computed. For each of the heat-generating components, a temperature elevation on the wire caused by the heat-generating component is computed. The temperature elevation is computed based on the temperature and decay profile of the heat-generating component and a spatial relationship between the wire and the heat-generating component. A total temperature elevation on the wire is computed by summing the temperature elevation of each of the heat-generating components. The heat-generating components include a plurality of wires of the IC chip and at least one device of the IC chip.

23 Claims, 9 Drawing Sheets

(56) References Cited

OTHER PUBLICATIONS

Pan, Stephen, Chang, Norman, Hitomi, Tadaaki; 3D-IC Dynamic Thermal Analysis with Hierarchical and Configurable Chip Thermal Model; IEEE 3D-IC Conference; San Francisco, CA; Oct. 2013.
Stout, Roger, Billings, David; Using Linear Superposition to Solve Multiple Heat Source Transient Thermal Problems; ASME-JSME Thermal Engineering and Heat Transfer Conference, InterPack 2007; Vancouver, Canada; Jul. 2007.

\* cited by examiner

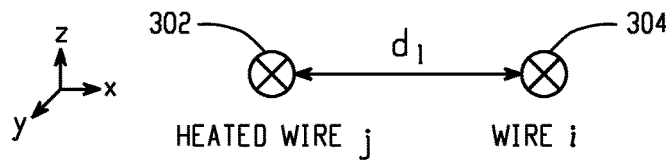
Fig. 3A
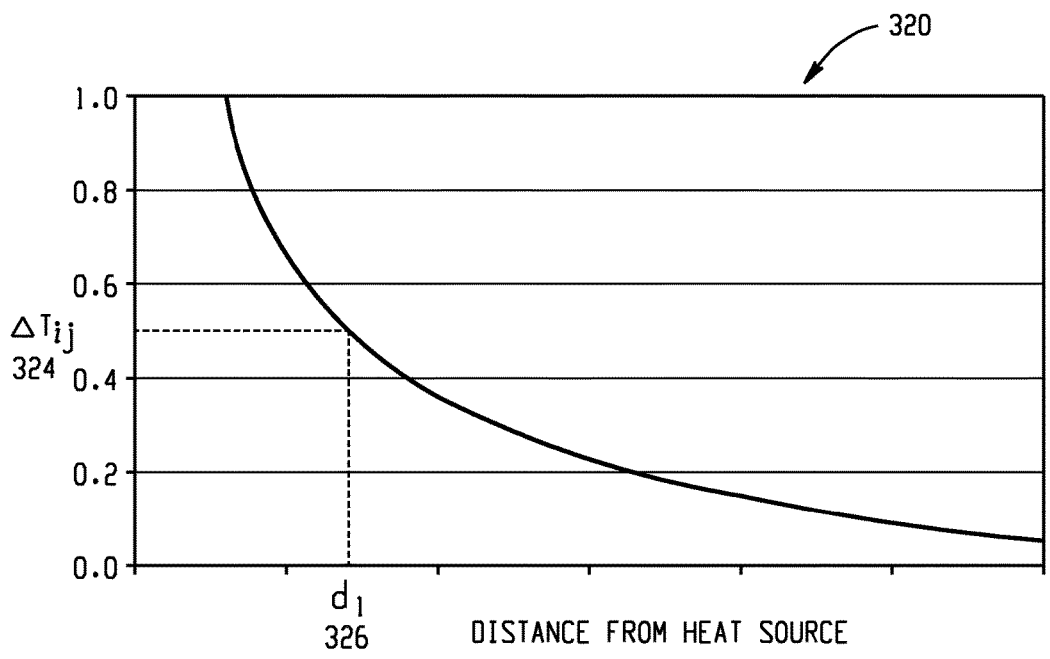
Fig. 3B
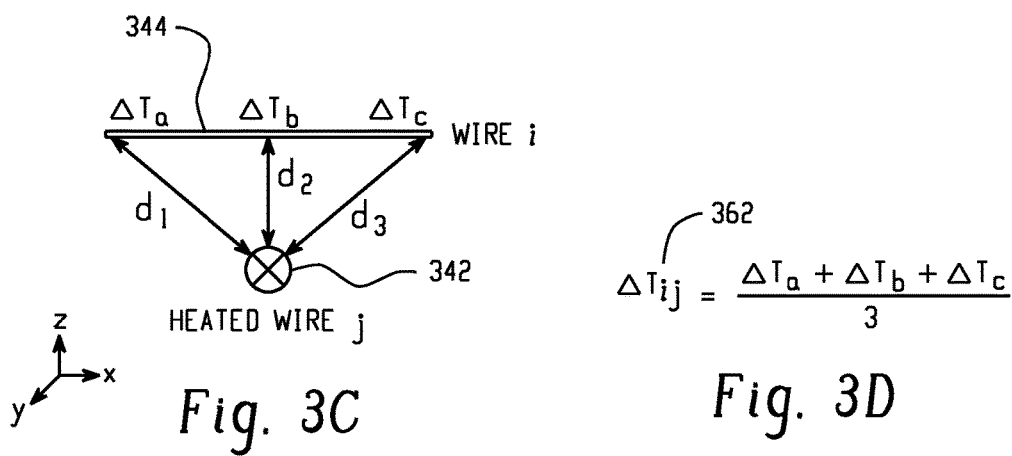
Fig. 3C
$$\Delta T_{ij} = \frac{\Delta T_a + \Delta T_b + \Delta T_c}{3}$$
Fig. 3D

US 10,371,583 B1

SYSTEMS AND METHODS FOR ESTIMATING TEMPERATURES OF WIRES IN AN INTEGRATED CIRCUIT CHIP

CROSS-REFERENCE TO RELATED APPLICATIONS

This application claims priority to U.S. Provisional Patent Application No. 62/078,075, filed Nov. 11, 2014, entitled "Systems and Methods for Estimating Temperatures of Wires in an Integrated Circuit Chip," which is incorporated herein by reference in its entirety.

FIELD

This disclosure is related generally to computer-aided design and more particularly to systems and methods for estimating a temperature of a wire of an integrated circuit (IC) chip.

BACKGROUND

An integrated circuit ("IC") is a device that includes a plurality of electronic components, such as transistors, resistors, and diodes, among others. These electronic components can be connected together to form circuit components such as gates, cells, memory units, and controllers, for example. An IC includes multiple layers of wiring that interconnect its electronic and circuit components.

SUMMARY

Systems, methods, and non-transitory computer-readable storage mediums are provided for estimating a temperature of a wire i of an integrated circuit (IC) chip having a plurality of heat-generating components. In an example computer-implemented method for estimating a temperature of a wire i of an integrated circuit (IC) chip having a plurality of heat-generating components, for each of the heat-generating components, a temperature of the heat-generating component during operation of the IC chip is computed. For each of the heat-generating components, a decay profile that defines a thermal coupling from the heat-generating component to wires of the IC chip as a function of distance from the heat-generating component is computed. For each of the heat-generating components, a temperature elevation $\Delta T$ on the wire i caused by the heat-generating component is computed. The temperature elevation $\Delta T$ is computed based on (i) the temperature of the heat-generating component, (ii) the decay profile of the heat-generating component, and (iii) a spatial relationship between the wire i and the heat-generating component. A total temperature elevation $\Delta T_i$ on the wire i is computed by summing the temperature elevation $\Delta T$ of each of the heat-generating components. The heat-generating components include a plurality of wires of the IC chip and at least one device of the IC chip.

An example computer-implemented system for estimating a temperature of a wire i of an integrated circuit (IC) chip having a plurality of heat-generating components includes a processing system and a memory in communication with the processing system. The processing system is configured to execute steps. In executing the steps, for each of the heat-generating components, a temperature of the heat-generating component during operation of the IC chip is computed. For each of the heat-generating components, a decay profile that defines a thermal coupling from the heat-generating component to wires of the IC chip as a function of distance from the heat-generating component is computed. For each of the heat-generating components, a temperature elevation $\Delta T$ on the wire i caused by the heat-generating component is computed. The temperature elevation $\Delta T$ is computed based on (i) the temperature of the heat-generating component, (ii) the decay profile of the heat-generating component, and (iii) a spatial relationship between the wire i and the heat-generating component. A total temperature elevation $\Delta T_i$ on the wire i is computed by summing the temperature elevation $\Delta T$ of each of the heat-generating components. The heat-generating components include a plurality of wires of the IC chip and at least one device of the IC chip.

An example non-transitory computer-readable storage medium for estimating a temperature of a wire i of an integrated circuit (IC) chip having a plurality of heat-generating components includes computer-executable instructions which, when executed, cause a processing system to execute steps. In executing the steps, for each of the heat-generating components, a temperature of the heat-generating component during operation of the IC chip is computed. For each of the heat-generating components, a decay profile that defines a thermal coupling from the heat-generating component to wires of the IC chip as a function of distance from the heat-generating component is computed. For each of the heat-generating components, a temperature elevation $\Delta T$ on the wire i caused by the heat-generating component is computed. The temperature elevation $\Delta T$ is computed based on (i) the temperature of the heat-generating component, (ii) the decay profile of the heat-generating component, and (iii) a spatial relationship between the wire i and the heat-generating component. A total temperature elevation $\Delta T_i$ on the wire i is computed by summing the temperature elevation $\Delta T$ of each of the heat-generating components. The heat-generating components include a plurality of wires of the IC chip and at least one device of the IC chip.

In another example, in a computer-implemented method for computing an allowable current density in a wire i of an integrated circuit (IC) chip having a plurality of heat-generating components, for each of the heat-generating components a temperature of the heat-generating component during operation of the IC chip is computed. For each of the heat-generating components, a decay profile that defines a thermal coupling from the heat-generating component to wires of the IC chip as a function of distance from the heat-generating component is computed. For each of the heat-generating components, a temperature elevation $\Delta T$ on the wire i caused by the heat-generating component is computed. The temperature elevation $\Delta T$ is computed based on (i) the temperature of the heat-generating component, (ii) the decay profile of the heat-generating component, and (iii) a spatial relationship between the wire i and the heat-generating component. A total temperature elevation $\Delta T_i$ on the wire i is computed by summing the temperature elevation $\Delta T$ of each of the heat-generating components. A temperature of the wire i is estimated based on a base temperature for wires of the IC chip and the total temperature elevation $\Delta T_i$. The heat-generating components include a plurality of wires of the IC chip and at least one device of the IC chip. The allowable current density in the wire i is computed based on a desired mean-time-to-failure (MTTF) of the wire i and the estimated temperature of the wire i.

BRIEF DESCRIPTION OF THE DRAWINGS

FIG. 3A depicts wires that are parallel to each other.

FIG. 3B depicts use of an example graph for determining a temperature elevation $\Delta T_{ij}$ on a wire i caused by a heated wire j.

FIG. 3C depicts wires that are routed perpendicular to each other.

FIG. 3D depicts an equation for determining a temperature elevation on a wire i caused by a heated wire j.

DETAILED DESCRIPTION

Figure 1:
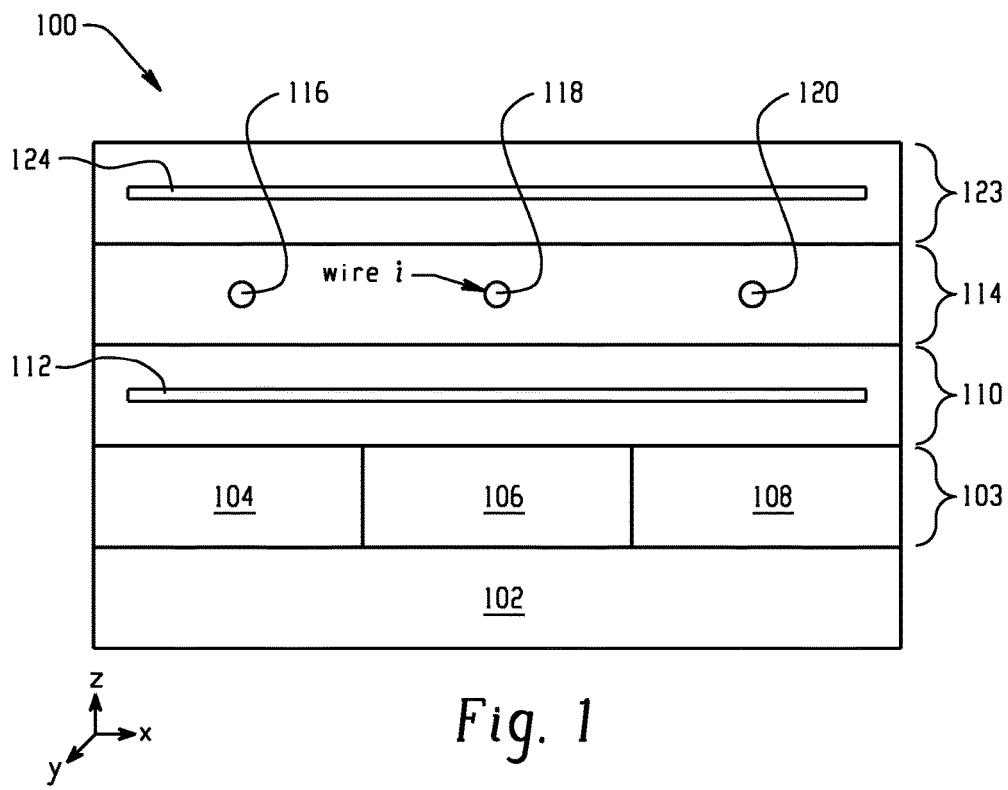
FIG. 1 is a block diagram depicting an example integrated circuit (IC) chip that includes a plurality of layers formed above a substrate.

FIG. 1 is a block diagram depicting an example integrated circuit (IC) chip 100 that includes a plurality of layers 103, 110, 114, 123 formed above a substrate 102. Specifically, the block diagram of FIG. 1 depicts a cross-sectional view of the IC chip 100, with the layers 103, 110, 114, 123 being stacked in a vertical direction, along a z-axis. The IC chip 100 may include a plurality of electronic components (e.g., transistors, resistors, diodes, etc.) that are not depicted in the example of FIG. 1. Such electronic components may be connected together to form circuit components such as gates, cells, memory units, and controllers, for example. The IC chip 100 includes multiple layers of wiring that interconnect the aforementioned electronic and circuit components. Examples of such layers of wiring are depicted in bottom, middle, and top layers 110, 114, 123 of FIG. 1. Specifically, the bottom layer 110 and the top layer 123 include wires 112, 124, respectively, that are routed along an x-axis. The middle layer 114 includes wires 116, 118, 120 that are routed in parallel to each other along a y-axis. The layers and wires depicted in the IC chip 100 are exemplary only, and in other examples, an IC chip includes a different number of layers or wires and/or a different arrangement of layers or wires.

In the example IC chip 100 of FIG. 1, the bottom, middle, and top layers 110, 114, 123 are formed substantially above a device layer 103. Formed within the device layer 103 is a first device 104, a second device 106, and a third device 108. The devices 104, 106, 108 may be, for example, planar field-effect transistor (FET) devices or FinFET devices, among other device types. The device layer 103 and the devices 104, 106, 108 formed therein are exemplary only, and in other examples, an IC chip has a device layer that includes a different number of devices and/or a different arrangement of devices. The device layer 103 is formed substantially above a substrate 102. The systems and methods for estimating a temperature of a wire of an IC chip described herein are not limited to complementary metal-oxide-semiconductor (CMOS) devices, and thus, it should be understood that the substrate 102 may be a silicon substrate or may be a substrate of another type (e.g., sapphire, glass, etc.).

To determine a reliability of the IC chip 100, a temperature of each of the wires 112, 116, 118, 120, 124 is estimated. Estimating these temperatures may be used in determining, for example, allowable currents on the wires 112, 116, 118, 120, 124, where the allowable currents are also based on a desired mean-time-to-failure (MTTF) for the wires. The relationship between wire temperature, current density limit, and MTTF is described in Black's Equation, which is $$MTTF = \frac{A}{J_{max}^2} \exp\frac{E_a}{k_B T_m}, \quad \text{(Equation 1)}$$

where A is a constant, $E_a$ is an activation energy, k is Boltzmann constant, $T_m$ is the temperature of a wire, $J_{max}$ is a current density limit for the wire, and MTTF is the mean-time-to-failure for the wire. From Black's Equation, it can be seen that for a given MTTF, a higher wire temperature $T_m$ results in a lower current density limit on the wire. Black's Equation is used to predict failure of wires due to electromigration, which is the transport of material caused by the gradual movement of the ions in a conductor due to the momentum transfer between conducting electrons and diffusing metal atoms. Electromigration may cause undesired open circuits or shorting of circuits in an IC chip over time. The temperatures of the wires 112, 116, 118, 120, 124 also affect other aspects of the IC chip 100, such as power (e.g., leakage power), resistance of wires, signal timing, IR/dynamic voltage drop, and signal integrity.

In estimating the temperature of each of the wires 112, 116, 118, 120, 124, a thermal coupling effect is considered. To illustrate aspects of the thermal coupling effect, a temperature of the wire 118 of the IC chip 100 is estimated. In the discussion below, the wire 118 is referred to as "wire i," consistent with the label included in FIG. 1. The temperature of the wire i is based on, among other things, (i) heat that is coupled from the other wires 112, 116, 120, 124 to the wire i, and (ii) heat that is coupled from the devices 104, 106, 108 to the wire i. As described below, the temperature of the wire i is estimated based on a linear superposition method, whereby a total temperature elevation on the wire i caused by the wires 112, 116, 120, 124 and the devices 104, 106, 108 is equal to the sum of the temperature elevations which would have been caused by each of the wires and devices individually.

The wires 112, 116, 120, 124 and the devices 104, 106, 108 are referred to herein as "heat-generating components," due to their effect on the temperature of the wire i. The coupling of heat from the wires 112, 116, 120, 124 and devices 104, 106, 108 to the wire i can be significant. This is because, among other reasons, wires in modern IC chips are placed very close to each other (e.g., at sub-micron pitches), and these wires may be embedded in dielectric material that has low thermal conductivity (e.g., 1.38 W/m-C for low-K dielectric material, as compared to 400 W/m-C and 140 W/m-C for copper material and silicon material, respectively).

To estimate the temperature on the wire i, a number of values are determined for each of the heat-generating components. For each of the heat-generating components, a temperature of the heat-generating component during operation of the IC chip 100 is determined. For the wires 112, 116, 120, 124, the temperature of each wire during operation of the IC chip 100 is dependent on self-heating of the wire. The self-heating of the wires 112, 116, 120, 124 is based on an average or root-mean-squared (RMS) current through the wire during operation of the IC chip 100. Specifically, for a power or ground wire, self-heating of the wire is based on $(I_{AVG})^2 R_{wire}$, where $I_{AVG}$ is the average current on the wire during operation of the IC chip 100 and $R_{wire}$ is a resistance of the wire. For a signal wire, self-heating on the wire is based on $(I_{RMS})^2 R_{wire}$, where $I_{RMS}$ is the root-mean-squared current on the wire during operation of the IC chip 100 and $R_{wire}$ is a resistance of the wire.

For the devices 104, 106, 108, the temperature of each device during operation of the IC chip 100 may be dependent on self-heating of the device. As described in further detail below, the temperature of the devices 104, 106, 108 due to self-heating (i) may be approximated based on a predetermined temperature rise associated with the device during the operation of the IC chip 100, or (ii) may be determined based on a finite element analysis, where the finite element analysis is based on a simulation structure that includes a rectangular volume representing the device. When the finite element analysis is used, a temperature of the device during operation of the IC chip 100 is based on self-heating of the rectangular volume, as determined from the finite element analysis.

Figure 2:
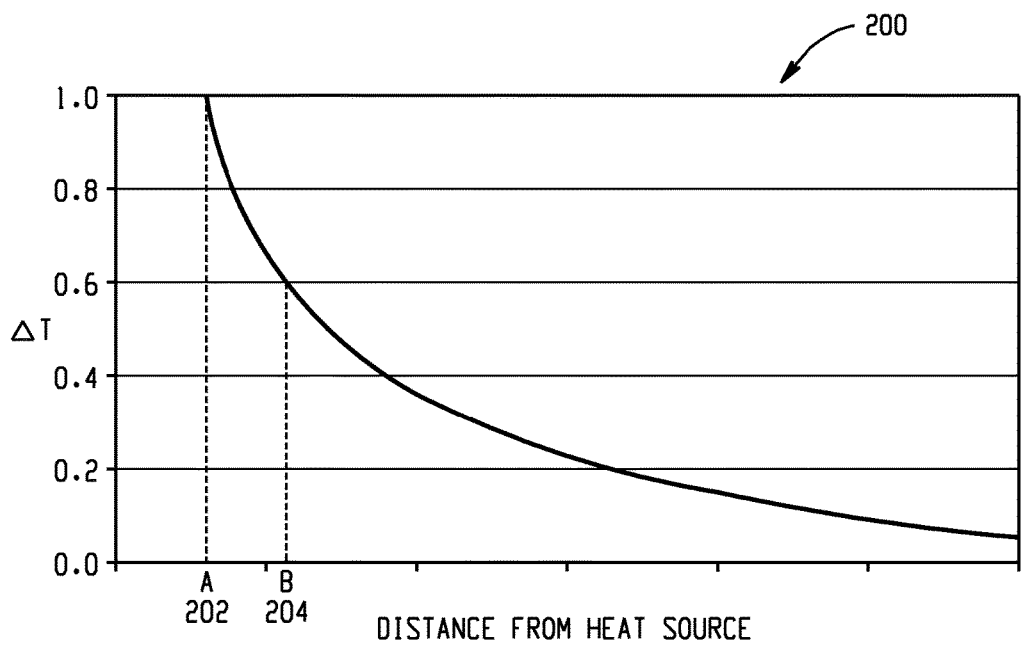
FIG. 2 is a graph depicting an example decay profile that defines a thermal coupling from a heat-generating component to wires of an IC chip.

For each of the heat-generating components, a decay profile is determined. The decay profile defines a thermal coupling from the heat-generating component to wires of the IC chip 100. Specifically, the decay profile defines the thermal coupling as a function of distance from the heat-generating component. FIG. 2 is a graph depicting an example decay profile 200. In the graph of FIG. 2, an x-axis represents a distance from the heat-generating component, and a y-axis represents the thermal coupling from the heat-generating component to wires of the IC chip 100. In the example of FIG. 2, the thermal coupling is normalized to a maximum thermal coupling amount. For example, if a wire located a distance "A" 202 from the heat generating component receives a maximum heat transfer from the heat-generating component (e.g., a heat transfer that causes a temperature elevation of 10 degrees Celsius on the wire), then a wire located a distance "B" 204 from the heat-generating component receives 60% of the maximum heat transfer (e.g., a heat transfer that causes a temperature elevation of 6 degrees Celsius on the wire).

As illustrated in the decay profile 200, the thermal coupling decreases as the distance from the heat-generating component increases. Thus, for a wire located a very small distance away from the heat-generating component, a relatively large amount of heat will be coupled from the heat-generating component to the wire. Conversely, for a wire located a farther distance away from the heat-generating component, a smaller amount of heat will be coupled from the heat-generating component to the wire. The profile 200 is said to be a "decay profile" based on the negative relationship between thermal coupling and distance from the heat-generating component. The use of a decay profile to determine a temperature elevation on a wire i caused by a heat-generating component is described in greater detail below with reference to FIGS. 3A and 3B.

For each of the heat-generating components, a temperature elevation ΔT on the wire i caused by the heat-generating component is determined. The temperature elevation ΔT is determined based on (i) the temperature of the heat-generating component, (ii) the decay profile of the heat-generating component, and (iii) a spatial relationship between the wire i and the heat-generating component. FIGS. 3A-3D illustrate aspects of determining the temperature elevation ΔT on the wire i caused by the heat-generating component.

In FIG. 3A, wires 302, 304 are parallel to each other, with the wires 302, 304 being routed along a y-axis and separated by a distance $d_1$. The wires 302, 304 are part of an IC chip. As denoted in FIG. 3A, the wire 302 is a heated wire j, and the wire 304 is a wire i that receives heat from the wire j via a thermal coupling effect. To determine the temperature elevation $\Delta T_{ij}$ 324 on the wire i 304 that is caused by the heated wire j 302, a decay profile 320 depicted in FIG. 3B is used. The decay profile 320 is for the heated wire j 302 and defines a thermal coupling from the heated wire j 302 to other wires of the IC chip as a function of distance from the heated wire j 302, similar to the decay profile 200 of FIG. 2. The temperature elevation $\Delta T_{ij}$ 324 on the wire i 304 that is caused by the heated wire j 302 is determined by evaluating the decay profile 320 at the distance $d_1$, which is denoted on the x-axis at 326.

As explained above, a temperature elevation ΔT on the wire i caused by a heat-generating component is determined based on, among other things, a spatial relationship between the wire i and the heat-generating component. In FIG. 3A, the wire-routing orientation of the wire i 304 with respect to the heated wire j 302 is determined, and the wires 302, 304 are determined to be parallel to each other. Based on the determination that the wires 302, 304 are parallel to each other, the temperature elevation $\Delta T_{ij}$ 324 on the wire i 304 that is caused by the heated wire j 302 is determined using the decay profile 320 in the manner described above. With reference to FIG. 3C, to determine the temperature elevation $\Delta T_{ij}$ 362 on a wire i 344 that is caused by a heated wire j 342, an alternative method is used because the wires 342, 344 are not parallel to each other.

As shown in FIG. 3C, the wires 342, 344 are perpendicular to each other (i.e., the wire 342 crosses the wire 344), with the heated wire j 342 being routed along a y-axis, and the wire i 344 being routed along an x-axis. Based on a determination that the wire i 344 and the wire j 342 are not parallel to each other, a plurality of local temperature elevations $\Delta T_A$, $\Delta T_B$, $\Delta T_C$ at different locations along a length of the wire i 344 are determined. Each of the plurality of local temperature elevations $\Delta T_A$, $\Delta T_B$, $\Delta T_C$ is caused by the heated wire j. The local temperature elevations $\Delta T_A$, $\Delta T_B$, $\Delta T_C$ are determined based on a predetermined decay profile for the heated wire j 342 in a manner similar to that described above with reference to FIG. 3B (i.e., the decay profile for the heated wire 342 is evaluated at various distances that correspond to different portions along the length of the wire 344). In the example of FIG. 3C, the local temperature elevations $\Delta T_A$, $\Delta T_B$, $\Delta T_C$ are determined at a left-most portion, a middle portion, and a right-most portion of the wire i 344, respectively. Distances $d_1$, $d_2$, and $d_3$ between the heated wire j 342 and the different portions of the wire i 344 vary, and thus, the local temperature elevations $\Delta T_A$, $\Delta T_B$, $\Delta T_C$ caused by the heated wire j 342 may have different values. In light of the different temperature elevations $\Delta T_A$, $\Delta T_B$, $\Delta T_C$ along the length of the wire i 344, the temperature elevation $\Delta T_{ij}$ 362 on the wire i 344 caused by the heated wire j 342 may be determined by averaging the plurality of local temperature elevations $\Delta T_A$, $\Delta T_B$, $\Delta T_C$, as shown in FIG. 3D.

FIGS. 3A-3D illustrate the determination of a temperature elevation $\Delta T$ on a wire i caused by wires that are parallel and perpendicular to the wire i. It should be understood that in other examples where the heated wire j and the wire i are not parallel or perpendicular to each other, similar methods are used to determine the temperature elevation $\Delta T$. For example, in an IC chip where the heated wire j crosses the wire i at an angle of 45 degrees, local temperature elevations at different locations along a length of the wire i are determined and averaged to determine the temperature elevation $\Delta T_{ij}$, similar to the method described above with reference to FIGS. 3C and 3D.

In the example of FIGS. 3A-3D, heated wires 302, 342 cause temperature elevations on wires 304, 344, respectively. Thus, in these examples, the heat-generating component causing the temperature elevation on the wire i is another wire. It should be understood, however, that the heat-generating component may also be a device included on the IC chip and that the temperature elevation on the wire i caused by the device may be determined in a manner similar to that described in FIGS. 3A-3D. Specifically, if the heat-generating component is a device, a self-heating temperature of the device that occurs during operating of the IC chip is determined (e.g., using a pre-defined temperature rise associated with the device or by performing a finite element analysis simulation where the device is modeled as a rectangular volume). A thermal decay profile for the device that is similar to the profile 200 of FIG. 2 is determined. Based on the self-heating temperature and the thermal decay profile, the temperature elevation $\Delta T$ on the wire i is determined in a manner that takes into account (i) a distance or distances between the wire i and the device, and (ii) a wire routing orientation of the wire i with respect to the device.

With reference again to FIG. 1, to estimate the temperature on the wire i, the values determined for each of the heat-generating components 104, 106, 108, 112, 116, 120, 124 are used. Specifically, as noted above, for each of the heat-generating components 104, 106, 108, 112, 116, 120, 124, the following values are determined: (i) a temperature of the heat-generating component during operation of the IC chip 100, (ii) a decay profile of the heat-generating component, and (iii) a temperature elevation $\Delta T$ on the wire i caused by the heat-generating component. A total temperature elevation $\Delta T_i$ on the wire i is determined by summing the temperature elevation $\Delta T$ of each of the heat-generating components 104, 106, 108, 112, 116, 120, 124. The total temperature elevation $\Delta T_i$ on the wire i is thus determined based on a linear superposition method. In the example of FIG. 1, seven $\Delta T$ values corresponding to the three devices 104, 106, 108 and the four wires 112, 116, 120, 124 that cause a temperature elevation on the wire i are summed to determine the total temperature elevation $\Delta T_i$.

More generally, a total temperature elevation $\Delta T_i$ on a wire i due to thermal coupling from n neighboring wires and devices of an IC chip is $$\Delta T_i = \sum_{j=1}^{n} \Delta T_{ij},$$ (Equation 2)

where $\Delta T_{ij}$ is a temperature rise on the wire i caused by a heated wire j or a heated device j. In an example, a cutoff distance or distances where the $\Delta T$ value becomes negligible is used to limit the number of neighboring wires and devices that are considered in the calculation of $\Delta T_i$. The temperature on the wire i is estimated based on a base temperature for the wire i and the total temperature elevation $\Delta T_i$. The base temperature for the wire i may be a predetermined uniform value that applies to all wires on the IC chip, or the base temperature may be based on a temperature profile (i.e., a temperature gradient) across the IC chip, where the temperature profile is based on the power distribution of devices (e.g., CMOS devices) on the IC chip. In an example utilizing the temperature profile to determine the base temperature, the temperature profile is determined based on a finite element analysis of the IC chip in a chip-package-system (CPS) environment.

Although portions of this disclosure explain the estimation of the temperature of the single wire i, it should be understood that the method can be used to estimate temperatures of all wires of an IC chip (e.g., the process is repeated for each of the different wires of the IC chip, or the process is performed for multiple wires in parallel, etc.). It should also be understood that estimating the temperature of the wire i may take into account various other factors that are not described in detail herein (e.g., self-heating of the wire i, heating from devices in switching or idle mode, a thermal environment of the IC chip in a package with a complex thermal conductivity distribution and multiple die heating, variations of the CPS environment, material distributions, etc.). For example, various thermal boundary conditions surrounding the IC chip or package may be considered in estimating the final temperature level in wires of the IC chip.

The systems and methods for estimating temperatures of wires of an IC chip described herein differ from conventional techniques. For example, one conventional technique for estimating temperatures of wires of an IC chip uses a thermal field solver to solve a thermal field problem for all wires in the interconnection layers of the IC chip using finite element analysis or computational fluid dynamics analysis. For modern IC chips, the thermal field problem is excessively large, and determining the thermal field solution is difficult. In particular, determining the thermal field solution for wires is difficult due to the large number of wires in complex modern IC chips, which may number in the multi-millions. Determining such conventional thermal field solutions may require explicit wire modeling for each of the wires along with modeling of the dielectric fillings and/or other features of the IC chip. This conventional solution may thus require modeling and simulation of the full interconnection scheme, which may be impossible with the technology currently available. Simplifications such as lumping of wires and dielectrics may cause the estimated temperatures of wires to be incorrect. In contrast to these conventional approaches, the systems and methods described herein do not utilize modeling and simulation of the full interconnection scheme and do not utilize lumping of wires and dielectrics.

The subject matter described herein improves the functioning of a computer system as compared to the conventional approaches, because the techniques utilized herein enable the estimation of temperatures of wires of an IC chip to be carried out (i) more efficiently (e.g., faster), (ii) with a reduced processing burden, and (iii) with reduced memory requirements, as compared to the conventional approaches. The techniques described herein improve the functioning of the computer system without sacrificing accuracy in the estimation of the temperatures. It is further noted that the computerized approaches described herein for estimating temperatures of wires of an IC chip are not of a type that could be carried out by the mental acts of humans. Humans are not capable of performing the large number of calculations that are required to determine solutions for the complicated interconnect schemes described herein. Also, mental acts performed by humans would not include use of the aforementioned finite element analysis and other computer-centric approaches described herein.

Figure 4B:
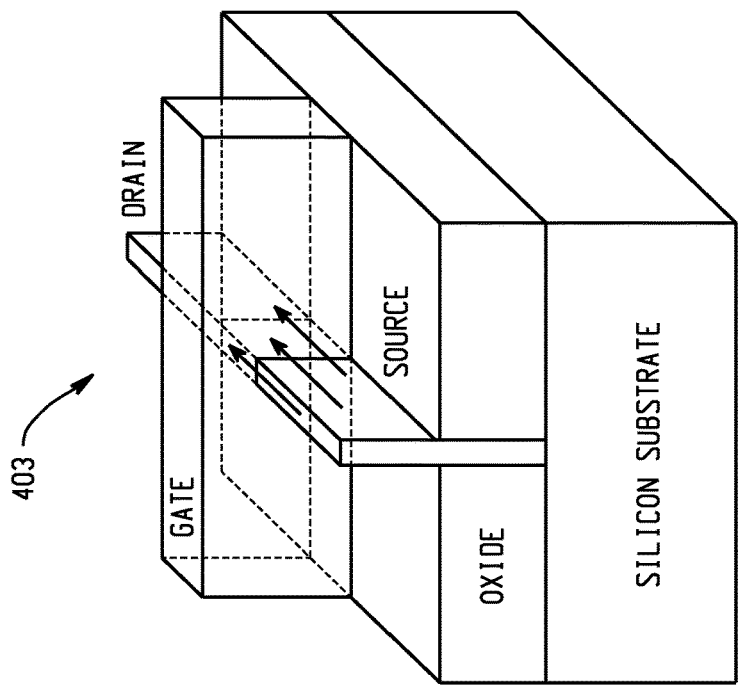
FIGS. 4A and 4B depict an example IC chip including a FinFET device included in a device layer of the IC chip.
Figure 4A:
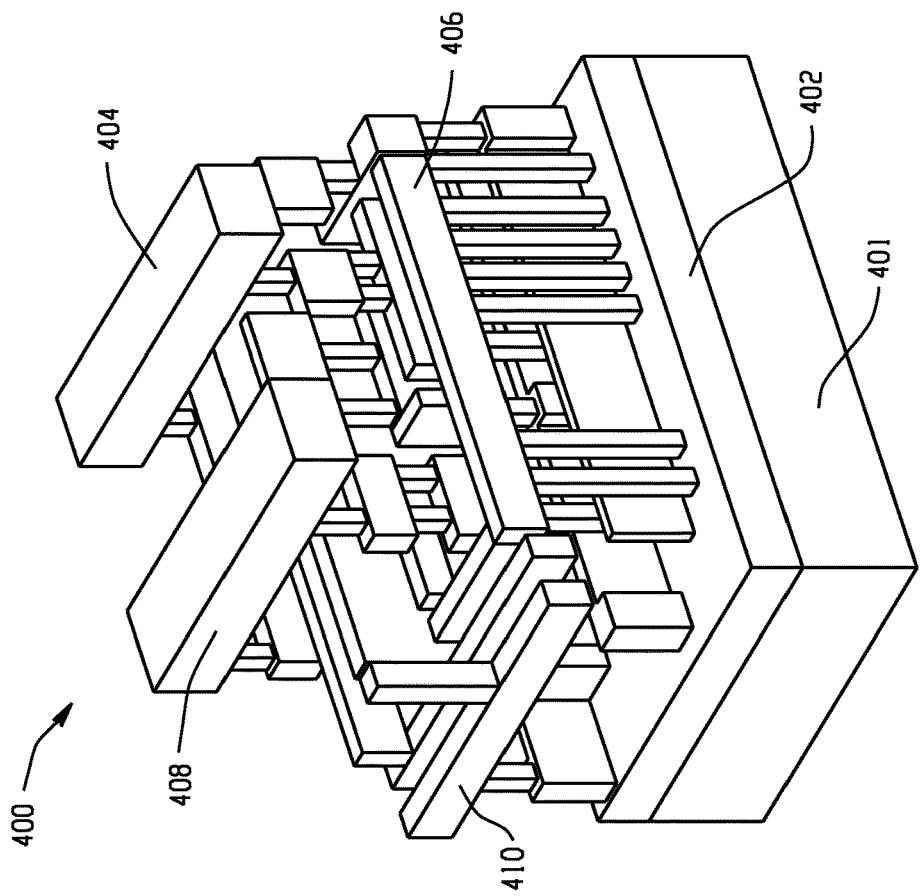

FIG. 4A depicts an example IC chip 400. The example IC chip 400 of FIG. 4A includes a silicon substrate 401 and a device layer 402 that is formed substantially above the silicon substrate 401. Within the device layer 402, a plurality of devices 403 are formed. FIG. 4B depicts one such device 403. In the example of FIGS. 4A and 4B, the plurality of devices 403 include, for example, FinFET devices and/or devices of other types (e.g., planar FET devices). The devices formed in the device layer 402 are known as front-end-of-line (FEOL) devices. Various back-end-of-line (BEOL) structures are formed above the device layer 402, and these BEOL structures include wires 404, 406, 408, 410. Both the FEOL devices 403 and the wires 404, 406, 408, 410 of the BEOL structures experience self-heating, and heat caused by the self-heating is coupled to wires of the IC chip 400. A total temperature elevation on a wire 404 takes into account this thermal coupling from each of the FEOL devices 403 and wires 406, 408, 410 using the linear superposition method described above with reference to FIGS. 1-3D.

In determining the temperature elevation on the wire 404 due to self-heating of the neighboring devices 403, each of the devices 403 is modeled as a rectangular volume with an associated self-heating temperature. A self-heating temperature of a rectangular volume describes a temperature rise of an associated device 403 that occurs during operation of the IC chip 400. A self-heating temperature of a rectangular volume (i) may be determined via a finite element analysis or computational fluid dynamics thermal simulation, (ii) may be determined directly from a measurement-based equation, or (iii) may be determined based on a predefined temperature rise for the devices 403. After determining the self-heating temperatures for each of the rectangular volumes, the following are determined for each of the rectangular volumes: (i) a decay profile that defines a thermal coupling from the rectangular volume to wires of the IC chip 400 as a function of distance from the rectangular volume, and (ii) a temperature elevation ΔT on the wire 404 caused by the rectangular volume. The value ΔT is based at least on the self-heating temperature of the rectangular volume, the decay profile of the rectangular volume, and a spatial relationship between the wire 404 and the rectangular volume. In general, a rectangular volume representing a device 403 of the device layer 402 is treated similar to a wire in determining the temperature elevation on a wire i caused by the rectangular volume.

Figure 5:
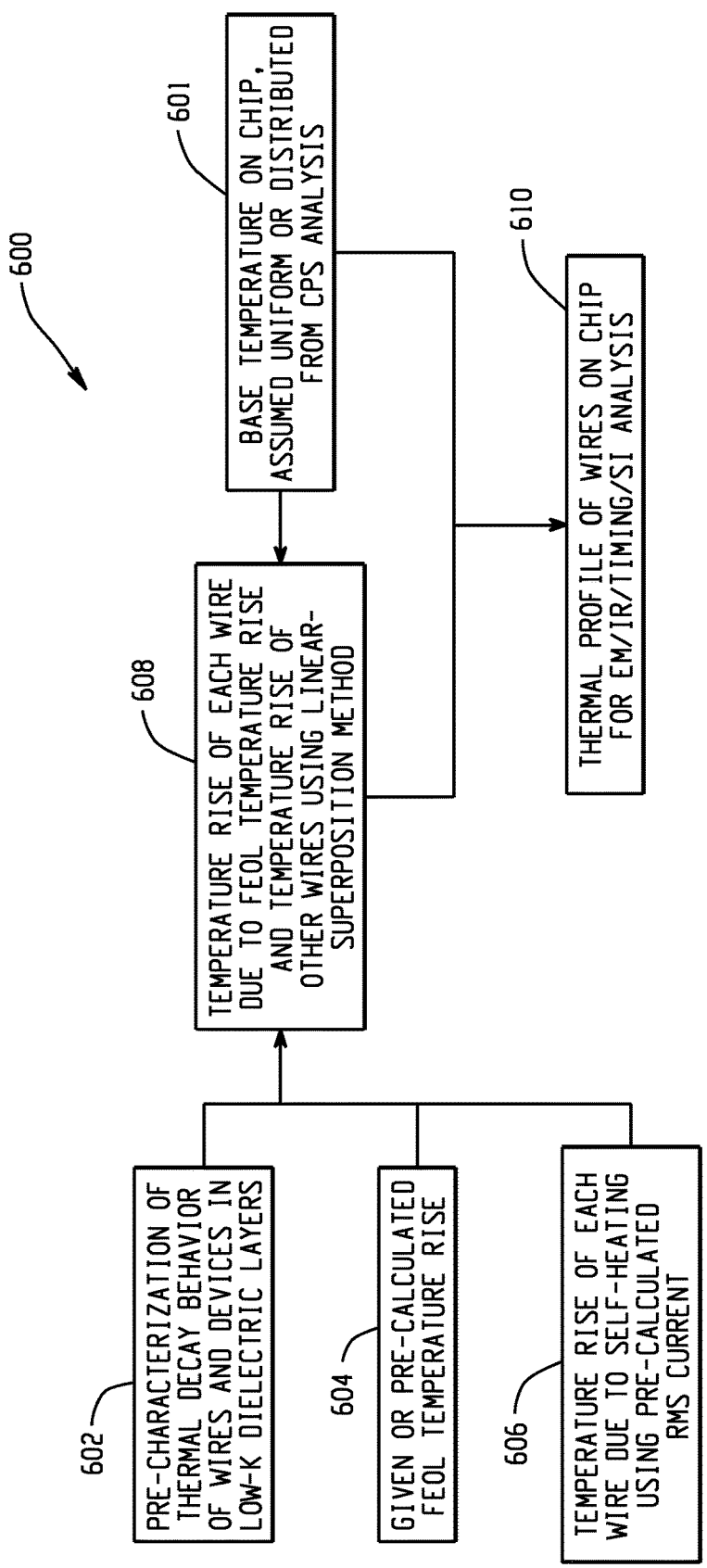
FIG. 5 depicts a flowchart for determining a thermal profile of wires on an IC chip.

FIG. 5 depicts a flowchart 600 for determining a thermal profile of wires of an IC chip. The IC chip may include a Complementary Metal-Oxide-Semiconductor (CMOS) integrated circuit, a gallium nitride (GaN) integrated circuit, a photonic integrated circuit, a radio frequency integrated circuit (RFIC), a bipolar junction transistor (BJT) integrated circuit, a power management integrated circuit (PMIC), or another type of circuit or device. At 602, thermal decay behavior of wires and devices included in the IC chip is determined. As explained above with reference to FIGS. 1-3D, in estimating a temperature of a wire i of an IC chip, for each heat-generating component included in the IC chip, a decay profile that defines a thermal coupling from the heat-generating component to wires of the IC chip as a function of distance from the heat-generating component is determined. An example of a decay profile that shows thermal decay behavior of a wire or a device is illustrated in FIG. 2. In an example, the determining of the decay profile of the heat-generating component utilizes a finite element analysis.

Figure 6A:
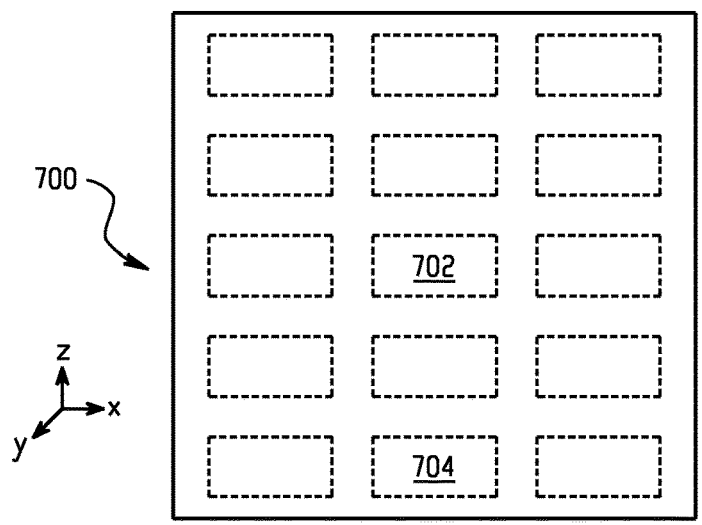
FIG. 6A depicts a cross-sectional view of an IC chip that includes a plurality of wires, including a wire and a neighboring wire.

To illustrate the use of the finite element analysis to determine the decay profile for a heat-generating component, FIG. 6A depicts an IC chip 700 that includes a plurality of layers stacked in a vertical direction. In particular, FIG. 6A depicts a cross-sectional view of the IC chip 700 that includes a plurality of wires formed within the stacked layers. The wires are represented by the dashed-line boxes and are routed along y-axis, with the wires running parallel to each other. The example IC chip 700 of FIG. 6A has fifteen wires, including a wire 702 and a wire 704. To determine the decay profile associated with the wire 702, a finite element analysis based on a simulation structure 710 illustrated in FIG. 6B is performed.

Figure 6B:
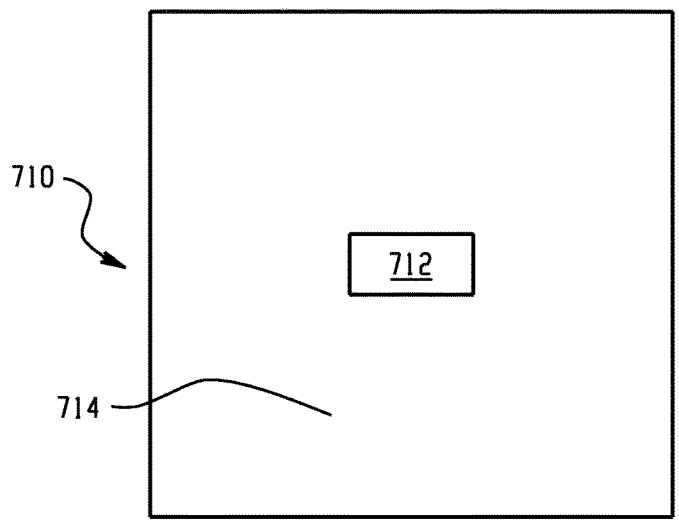
FIG. 6B depicts a finite element analysis (FEA) simulation structure used in determining a decay profile of a first wire of an IC chip.

The FEA simulation structure 710 of FIG. 6B includes an element 712 representing the wire 702. The element 712 representing the wire 702 (i) is embedded within low-K dielectric material 714, and (ii) is located at a height in the simulation structure 710 that corresponds to a layer of the plurality of layers in which the wire 702 is included. It should be understood that the FEA simulation structure 710 utilizes "one-wire modeling" and does not consider the effect of other wires or other heat-generating components of the IC chip 700. Thus, the simulation structure 710 does not include elements representing the other wires or heat-generating components and instead includes only the element 712 and the dielectric material 714. The finite element analysis simulation is performed using the simulation structure 710 to determine the decay profile of the wire 702, where the decay profile is a decaying profile similar to that depicted in FIG. 2. The finite element analysis simulation is performed using appropriate thermal boundary conditions in an area with sufficiently large margins to obtain the thermal decay profile.

Figure 6C:
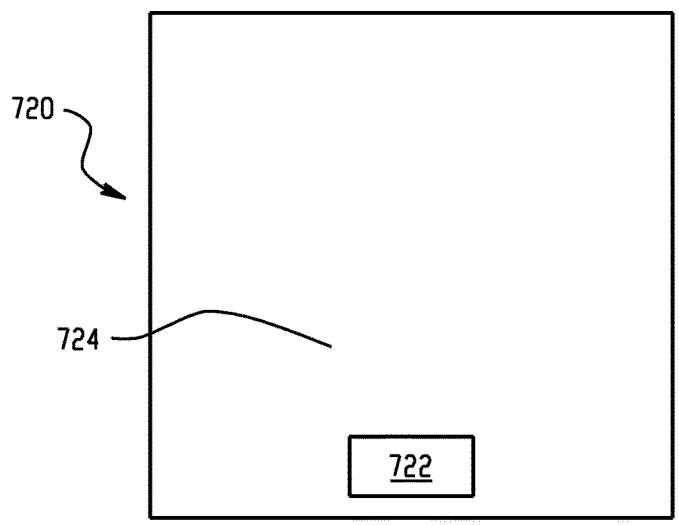
FIG. 6C depicts an FEA simulation structure used in determining a decay profile of a second wire of the IC chip.

In a similar manner, to determine a decay profile of the wire 704 of the IC chip 700, a finite element analysis based on a simulation structure 720 illustrated in FIG. 6C is performed. The FEA simulation structure 720 includes an element 722 representing the wire 704. The element 722 representing the wire 704 is embedded within low-K dielectric material 724 and located at a height in the structure 720 that corresponds to a layer of the IC chip 700 in which the wire 704 is located. Like the simulation structure 710 described above with reference to FIG. 6B, the FEA simulation structure 720 of FIG. 6C utilizes a simplified, one-wire modeling approach in determining the decay profile of the wire 704.

In other examples, the one-wire modeling approach is not used in determining thermal decay profiles for wires of the IC chip 700. For example, simulation structure 730 of FIG. 6D includes an element 732 representing the wire 702 and elements 736-749 representing the fourteen other wires of the IC chip 700. The simulation structure 730 is used in determining a decay profile associated with the wire 702. The element 732 representing the wire 702 is located at a height in the simulation structure 730 that corresponds to the layer of the plurality of layers in which the wire 702 is included. Although the element 732 representing the wire 702 is still embedded in low-K dielectric material 734, the element 732 is also surrounded by the elements 736-749 representing the other wires of the IC chip 700. The inclusion of these additional elements 736-749 may affect the determination of the decay profile for the wire 702 and may result in a decay profile that is different than a decay profile determined using the FEA simulation structure 710 of FIG. 6B. Because the elements 736-749 may cause the decay profile to exhibit variation in different directions, the finite element analysis simulation performed using the simulation structure 730 may be used to determine decay profiles in each of the different directions shown in FIG. 6D (i.e., decay profiles may be determined in the 0, 45, 90, 135, 180, 225, 270, and 315 degrees directions). In an example, the multiple decay profiles in the different directions are averaged to determine a single decay profile for the wire 702. In another example, the multiple decay profiles are used separately to determine thermal coupling from the wire 702 to other wires of the IC chip 700, with the thermal coupling being dependent on a location of the heat-receiving wire in the xz-plane.

Figure 6D:
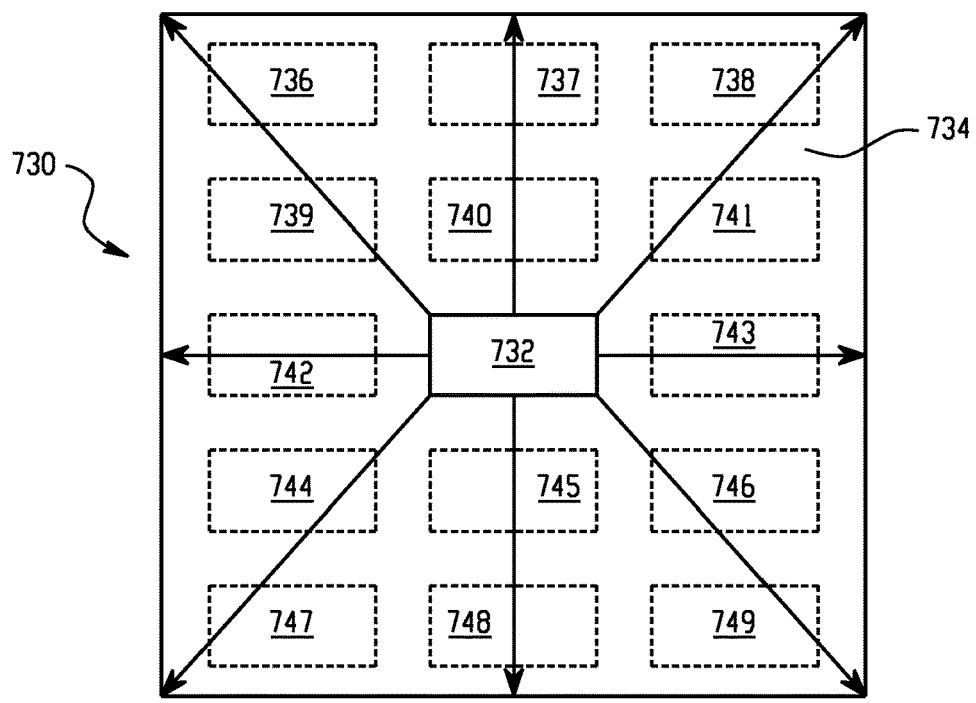
FIG. 6D depicts a second FEA simulation structure used in determining a decay profile of the first wire of the IC chip.
Figure 6E:
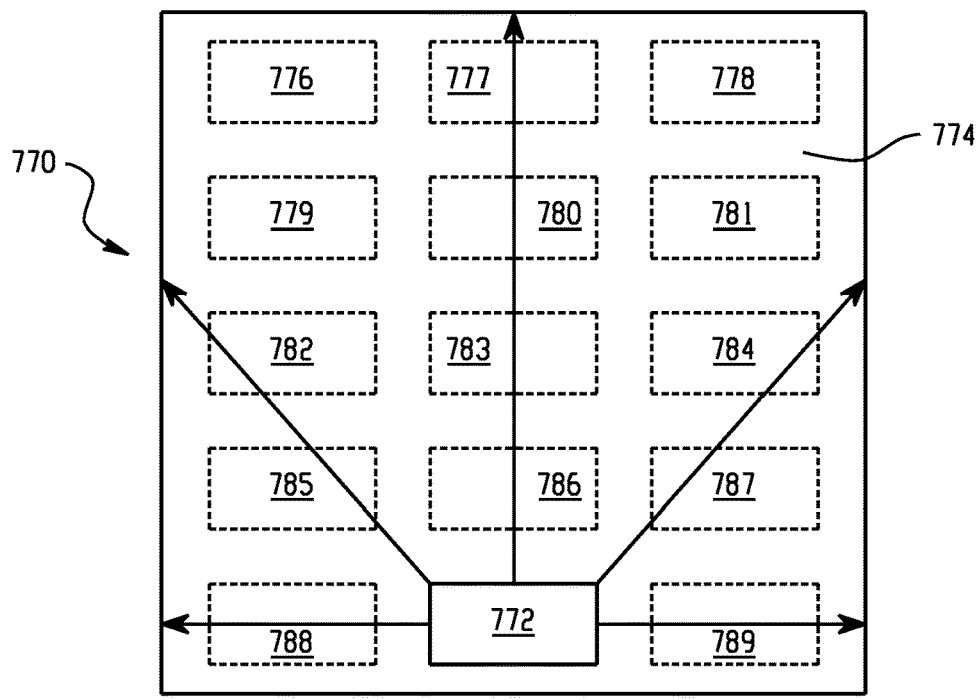
FIG. 6E depicts a second FEA simulation structure used in determining a decay profile of the second wire of the IC chip.

Likewise, to determine the thermal decay behavior of the wire 704 of the IC chip 700, a finite element analysis that does not utilize the one-wire modeling approach may be based on a simulation structure 770 illustrated in FIG. 6E. The simulation structure 770 of FIG. 6E includes an element 772 representing the wire 704 and elements 776-789 representing the fourteen other wires of the IC chip 700. The element 772 representing the wire 704 is located at a height in the structure 770 that corresponds to a layer of the IC chip 700 in which the wire 704 is located. In the simulation structure 770, the element 772 is surrounded by low-K dielectric material 774 and the elements 776-789 representing the other wires of the IC chip 700. The finite element analysis simulation performed using the simulation structure 770 may be used to determine decay profiles in each of the different directions shown in FIG. 6E (i.e., decay profiles may be determined in the 0, 45, 90, 135, and 180 degrees directions). It should be understood that the directions shown in FIGS. 6D and 6E are exemplary only and that decay profiles are determined in other directions in other examples.

Based on the examples of FIG. 6A-6E, it should be appreciated that the thermal decay behavior of a wire in the IC chip 700 may be based on a stack-up position of a layer in which the wire is included (i.e., the thermal decay behavior of the wire may be dependent on a location of the wire in the vertical direction). In an example where an IC chip includes m layers stacked in a vertical direction, with heat-generating components (i.e., heat-generating wires or devices) being included in each of the m layers, determining decay profiles for each of the heat-generating components includes performing m finite element analysis simulations. In the example, a finite element analysis is first performed for a bottom layer of the m layers. The performing of the finite element analysis includes generating a simulation structure including a thickness in the vertical direction that corresponds to that of the IC chip. The simulation structure includes (i) an element representing a heat-generating component at a height in the simulation structure that corresponds to that of the bottom layer in the m layers, and (ii) low-K dielectric material surrounding the element. A decay profile for the element is determined by performing the finite element analysis using the simulation structure. A similar finite element analysis is performed for each layer of the m layers to generate m decay profiles, with the simulation structure varying based on the layer of the m layers that is under consideration. Specifically, in the simulation structure, the placement of the heat-generating element in the z-direction is varied based on a layer of the m layers under consideration. For example, after performing the finite element analysis for the bottom layer (as described above), a placement of the element representing the heat-generating component is modified in the simulation structure, e.g., by placing the element at a height in the simulation structure that corresponds to a layer above the bottom layer. With the modified simulation structure, another finite element analysis is performed to determine the decay profile for the element located in the layer above the bottom layer. This process is repeated for each layer of the m layers to generate the m decay profiles. The generating of the m decay profiles may be used to "pre-characterize" the thermal decay behavior of wires and devices in low-K dielectric layers, with the elements representing the wires and the devices being varied from device layer to top layer with appropriate thermal boundary conditions in an area with sufficiently large margins. After generating the m decay profiles, each heat-generating component of the IC chip is associated with a decay profile of the m decay profiles. The associating is based on a layer of the m layers in which the heat-generating component is included.

FIGS. 6A-6E and the corresponding discussion included herein illustrate aspects of determining decay profiles for wires of an IC chip, where the decay profiles may be dependent on locations of the wires in the z-direction (i.e., a vertical direction). In other examples, locations of the wires in the z-direction (i.e., elevations of the wires) are not considered in determining the decay profile. In these other examples, a single decay curve may be determined, and the single decay curve is applied to all of the wires of the IC chip, regardless of the wires' elevations. To determine the single decay curve, a simulation structure includes an element representing the wire surrounded by dielectric material in all directions (e.g., similar to the FEA simulation structure 710 of FIG. 6B). The finite element analysis is performed using this simulation structure, and the resulting thermal decay profile applies to all wires at the different elevations.

It should be appreciated that determining decay profiles for devices included in a device layer of an IC chip may be performed in a similar manner. Specifically, to determine a decay profile (e.g., a decay profile similar to that depicted in FIG. 2) for a device included in the device layer, an FEA simulation structure is used. The FEA simulation structure includes a rectangular volume representing the device, where the rectangular volume is located at a height in the simulation structure that corresponds to that of the device layer of the IC chip. The simulation structure may utilize a "one-device modeling" approach, where the simulation structure includes only the rectangular volume and dielectric material and does not include elements representing other devices or wires of the IC chip. Alternatively, a more complex simulation structure maybe used, with the simulation structure including elements representing the other devices and wires of the IC chip. The finite element analysis is performed using the simulation structure to determine the thermal decay behavior of the rectangular volume that corresponds to the device.

With reference again to the flowchart 600 of FIG. 5, at 604, temperatures of FEOL devices during operation of the IC chip are determined, and at 606, temperatures of wires during operation of the IC chip are determined. Specifically, at 604 and 606, temperature rises on the FEOL devices and wires due to self-heating are determined, where the self-heating occurs during the operation of the IC chip. As explained above with reference to FIGS. 1-3D, in estimating a temperature of a wire i of an IC chip, for each heat-generating component included in the IC chip, a temperature of the heat-generating component during operation of the IC chip is determined. Wires and devices may comprise the heat-generating components of the IC chip, and the temperatures of both the wires and the devices during operation of the IC chip may be based on the aforementioned self-heating.

The temperature on the devices due to self-heating may be (i) approximated based on a predetermined temperature rise associated with the device during the operation of the IC chip, or (ii) determined based on a finite element analysis. The finite element analysis is based on a simulation structure that includes a rectangular volume representing the device, and the temperature of the device is determined based on a single self-heating temperature of the rectangular volume that is determined using the finite element analysis. The temperature on the wires due to self-heating may be determined based on a finite element analysis that utilizes a pre-calculated RMS or average current on the wires.

Figure 7A:
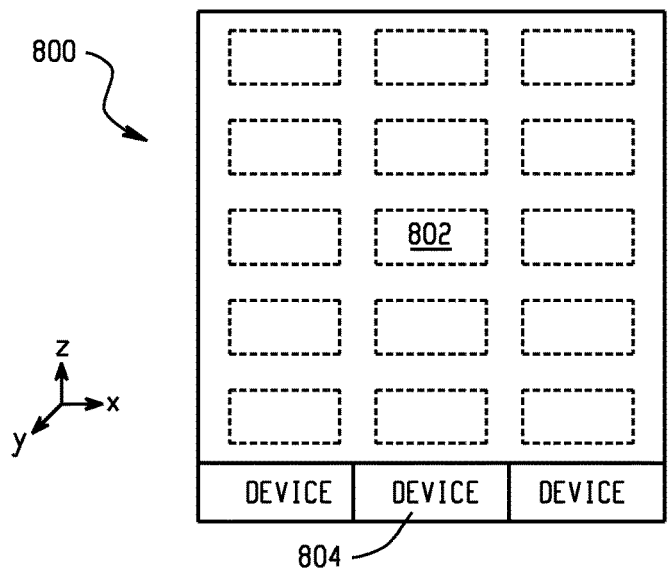
FIG. 7A depicts a cross-sectional view of an IC chip that includes a plurality of wires and a plurality of devices.

To illustrate the use of the finite element analysis in determining the temperatures of wires and devices during operation of the IC chip, FIG. 7A depicts an IC chip 800 that includes a plurality of layers stacked in a vertical direction. In particular, FIG. 7A depicts a cross-sectional view of the IC chip 800 that includes devices formed in a device layer of the IC chip 800 and a plurality of wires formed within layers that are stacked substantially over the device layer. As in FIG. 6A, the wires are represented by the dashed-line boxes and are routed along a y-axis, with the wires running parallel to each other. The example IC chip 800 of FIG. 7A includes fifteen wires, including a wire 802. The example IC chip 800 also includes first, second, and third devices, including a device 804.

Figure 7B:
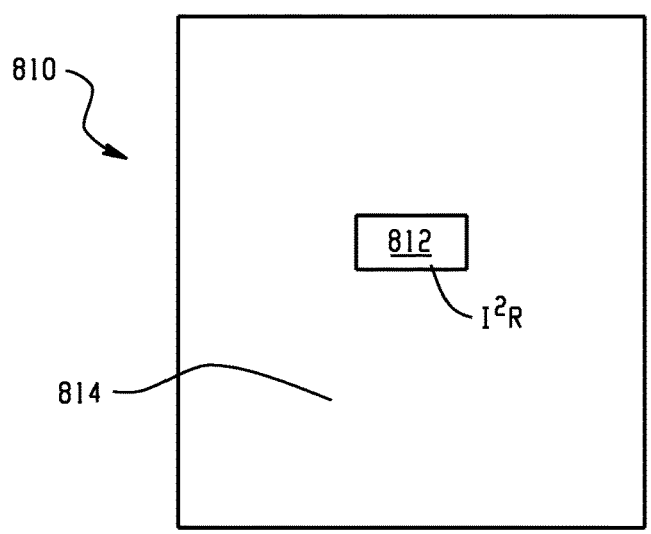
FIG. 7B depicts an FEA simulation structure used in determining a temperature of a wire of the IC chip.

To determine a temperature of the wire 802 during operation of the IC chip 800, a finite element analysis based on a simulation structure 810 illustrated in FIG. 7B is performed. The FEA simulation structure 810 of FIG. 7B includes an element 812 representing the wire. The element 812 representing the wire 802 is (i) embedded within low-K dielectric material 814, and (ii) is located at a height in the simulation structure 810 that corresponds to a layer of the plurality of layers in which the wire 802 is included. It should be understood that the FEA simulation structure 810 utilizes a one-wire modeling approach similar to that described above with reference to FIGS. 6B and 6C. In FIGS. 6B and 6C, the one-wire modeling approach is used in determining a thermal decay profile of wires included in an IC chip, and in FIG. 7B, the one-wire modeling approach is used in determining a temperature of the wire 802 during operation of the IC chip 800, where the temperature of the wire 802 is based on self-heating of the wire 802 that occurs during the operation of the chip 800. The finite element analysis simulation is performed using the simulation structure 810 to determine the temperature of the wire 802.

The temperature of the wire 802 that is based on the self-heating is dependent on a current on the wire 802 during the operation of the IC chip. If the wire 802 is a signal wire, the current considered is an RMS current on the wire 802, and if the wire 802 is a power or ground wire, the current considered is an average current on the wire 802. The RMS or average current used in the simulation may be based on a chip electromigration analysis. The FEA simulation structure 810 is used to calculate the temperature rise of the wire 802 over an initial reference temperature of the wire 802. The temperature of the wire 802 may be generally uniform along the length of the wire 802 and may be a function of self-heating power (i.e., $I^2R$, where I is the RMS current or the average current, as described above). The temperature of the wire 802 may also be dependent on a location of the wire in the z-direction (i.e., the vertical direction) of the IC chip 800. For this reason, the element 812 representing the wire 802 is located at an appropriate height within the dielectric material 814 of the structure 810.

Although the example of FIG. 7B depicts a simulation structure 810 used to determine a self-heating temperature of the wire 802, it should be understood that similar other simulation structures may be used in determining self-heating temperatures of other wires included in the IC chip 800. In each of these simulation structures, an element representing the heat-generating wire is located at an appropriate height in the simulation structure and surrounded by low-K dielectric material. In another example, finite element analysis simulations are not used to determine the self-heating temperatures of the wires, and instead, formulas are derived based on previous finite element analysis simulation results and used in calculating the self-heating temperatures. The formulas are based on a self-heating power of the wires and a vertical location of the wires within the IC chip.

Figure 7C:
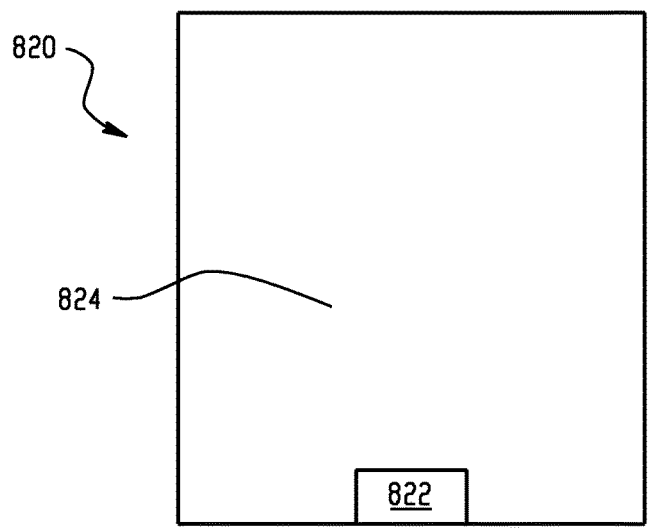
FIG. 7C depicts an FEA simulation structure used in determining a temperature of a device of the IC chip.

In a similar manner, to determine a temperature of the device 804 of the IC chip 800 due to self-heating of the device 804 that occurs during operation of the IC chip 800, a finite element analysis based on a simulation structure 820 illustrated in FIG. 7C is performed. The FEA simulation structure 820 includes an element 822 representing the device 804. Specifically, the element 822 may be a rectangular volume. The rectangular volume 822 representing the device 804 is embedded within low-K dielectric material 824 and located at a height in the simulation structure 820 that corresponds to the device layer of the IC chip 800. Temperature rises due to self-heating on FinFET or high-R devices may be available in the chip design at either gate or XTOR level, enabling these devices to be modeled as rectangular objects. For a planar CMOS chip, a temperature rise distribution due to a power map on the IC chip 800 may be obtained by finite element analysis of the chip 800 in a CPS environment. Like the simulation structure 810 described above with reference to FIG. 7B, the FEA simulation structure 820 of FIG. 7C utilizes a simplified, one-device modeling approach in determining the temperature on the device 804 due to self heating. In other examples, a finite element analysis simulation is not used, and a temperature on the device 804 due to self-heating is approximated based on a predetermined temperature rise associated with the device 804.

Although the examples of FIGS. 7B and 7C utilize the simplified one-wire and one-device approaches, respectively, for determining temperatures on the wire 802 and device 804 due to self-heating, in other examples, more complex simulation structures are used. The more complex simulation structures may include additional other elements representing other wires and/or devices of the chip 800. The more complex simulations structures may be similar to those of FIGS. 6D and 6E, which include the additional other elements representing the other wires and/or devices of the chip.

With reference again to the flowchart 600 of FIG. 5, at 608, a temperature rise on each wire due to (i) heat that is coupled from other wires, and (ii) heat that is coupled from devices is determined. The temperature rise of a wire i is determined based on a linear superposition method, whereby a total temperature elevation on the wire i caused by the other wires and the devices is equal to the sum of the temperature elevations which would have been caused by each of the wires and devices individually. The linear superposition method utilizes Equation 2 and the information determined in steps 602, 604, 606 of the flowchart 600. Estimating the temperature on the wire i further utilizes a base temperature for the wire i determined at 601, such that the final temperature on the wire i is equal to the sum of the base temperature and the total temperature elevation. The base temperature for the wire i may be a predetermined, uniform value that applies to all wires on the IC chip, or the base temperature may be based on a temperature profile (i.e., a temperature gradient) across the IC chip, where the temperature profile may be dominated by the power distribution of devices (e.g., CMOS devices) on the IC chip. In an example utilizing the temperature profile to determine the base temperature, the temperature profile is determined based on a finite element analysis of the IC chip in a chip-package-system (CPS) environment.

The performing of the steps 601, 602, 604, 606, 608 results in a thermal profile of wires on the IC chip, and the thermal profile may be used in a number of different analyses at 610. The different analyses include thermal-aware electromigration (EM) analysis, electric resistivity analysis for wires, timing analysis, IR drop analysis, dynamic voltage drop analysis, and signal integrity analysis, among others. For example, with a calculated temperature elevation and a given base temperature for every wire of the IC chip, thermal-aware electromigration analysis can be achieved by calculating allowable current densities on wires based on the temperature elevations. The resistance and electromigration limit of a wire is a function of temperature, and thus, the determination of the temperature elevations on the wires allows for a more accurate electromigration analysis.

Figure 8:
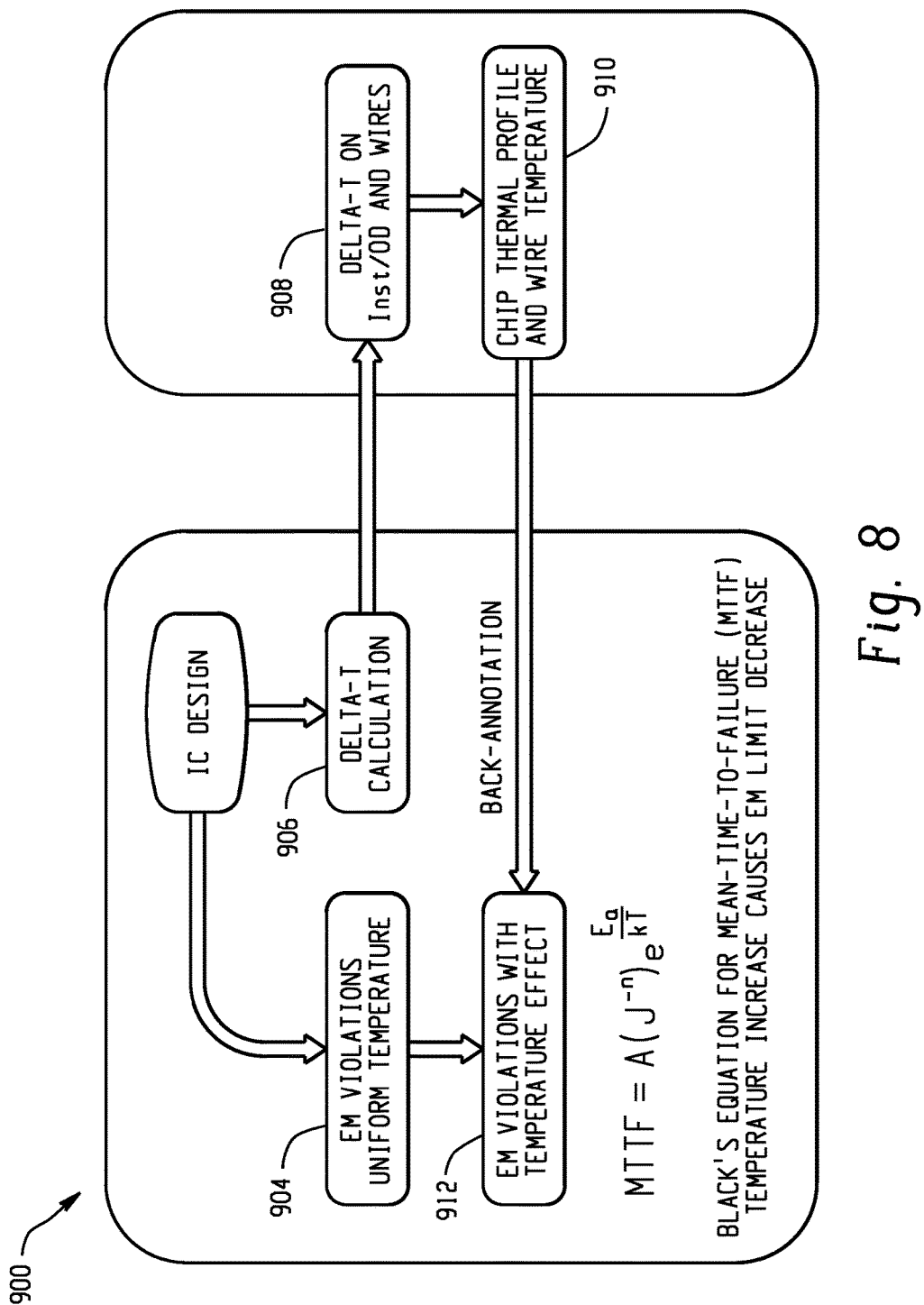
FIG. 8 is a flow diagram depicting example steps of a thermal-aware electromigration analysis.

FIG. 8 is a flow diagram 900 depicting example steps of a thermal-aware electromigration analysis. At 904, an electromigration analysis on an IC chip is performed using a static temperature analysis. The static temperature analysis may include, for example, (i) determining a maximum allowable current density on a wire i of the IC chip given a static temperature on the wire i and a desired MTTF of the wire i, or (ii) determining a MTTF for the wire i given the static temperature on the wire i and a current density on the wire i. Electromigration violations may be determined based on the analysis at 904. The static temperature analysis does not consider a temperature elevation on the wire i caused by coupling of heat from other wires or devices to the wire i.

At 906, a "delta-T calculation" is initiated. At 908, temperature elevations on the wires of the IC chip are determined. For example, for the wire i of the IC chip, the temperature elevation on the wire i is determined based on, among other things, (i) heat that is coupled from other wires of the IC chip to the wire i, and (ii) heat that is coupled from devices of the IC chip to the wire i. At 910, a chip thermal profile and temperatures of wires are determined based on the temperature elevations. At 912, the chip thermal profile and the temperatures of the wires are utilized in an electromigration analysis. Unlike the static temperature analysis at 904, the electromigration analysis at 912 takes into account the temperature elevation on wires due to the thermal coupling effect. Electromigration violations may be determined based on the analysis at 912, and these violations may differ from those determined at 904 due to the effect of the temperature elevations on the wires.

Figure 9:
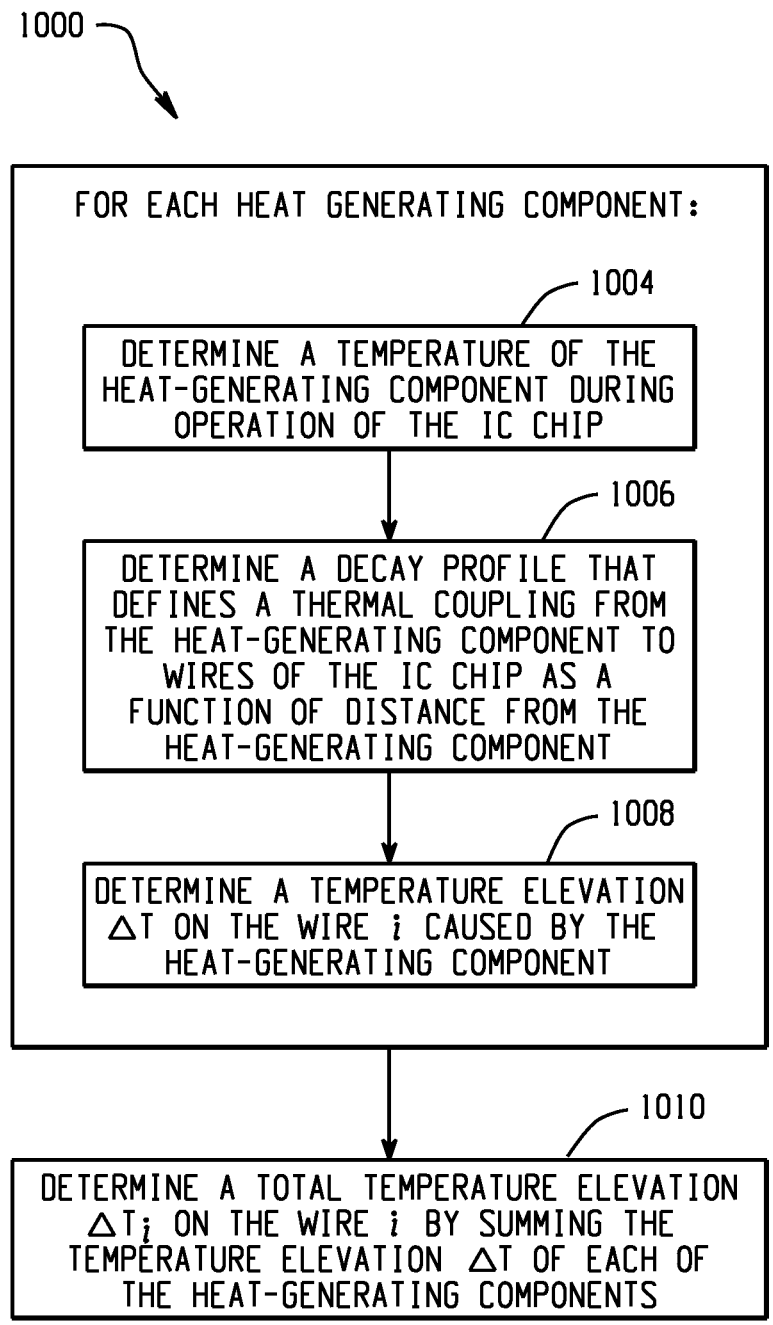
FIG. 9 is a flow diagram depicting example steps of a computer-implemented method for estimating a temperature of a wire i of an integrated circuit (IC) chip having a plurality of heat-generating components.

FIG. 9 is a flow diagram 1000 depicting example steps of a computer-implemented method for estimating a temperature of a wire i of an integrated circuit (IC) chip having a plurality of heat-generating components. At 1004, for each of the heat-generating components, a temperature of the heat-generating component during operation of the IC chip is determined. At 1006, for each of the heat-generating components, a decay profile that defines a thermal coupling from the heat-generating component to wires of the IC chip as a function of distance from the heat-generating component is determined. At 1008, for each of the heat-generating components, a temperature elevation $\Delta T$ on the wire i caused by the heat-generating component is determined. The temperature elevation $\Delta T$ is determined based on (i) the temperature of the heat-generating component, (ii) the decay profile of the heat-generating component, and (iii) a spatial relationship between the wire i and the heat-generating component. At 1010, a total temperature elevation $\Delta T_i$ on the wire i is determined by summing the temperature elevation $\Delta T$ of each of the heat-generating components. The heat-generating components include a plurality of wires of the IC chip and at least one device of the IC chip.

This written description uses examples to disclose the invention, including the best mode, and also to enable a person skilled in the art to make and use the invention. The patentable scope of the invention may include other examples. Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A computer-implemented method of estimating a temperature of a wire i of an integrated circuit (IC) chip having a plurality of heat-generating components, the method comprising:
accessing at least a portion of a computer readable model of the IC chip comprising the plurality of heat generating components and the wire i;
extracting, from the at least a portion of a computer readable model of the IC chip, model data describing one or more physical characteristics of a physical embodiment of the model of the IC chip;
computing, based on the model data, for each of the heat-generating components:
a temperature of the heat-generating component during operation of the IC chip;
a decay profile that defines a thermal coupling from the heat-generating component to wires of the IC chip as a function of distance from the heat-generating component; and
a temperature elevation $\Delta T$ on the wire i caused by the heat-generating component, the temperature elevation $\Delta T$ being computed based on (i) the temperature of the heat-generating component, (ii) the decay profile of the heat-generating component, and (iii) a spatial relationship between the wire i and the heat-generating component; and
computing a total temperature elevation $\Delta T_i$ on the wire i by summing the temperature elevation $\Delta T$ of each of the heat-generating components of at least the portion of computer readable model of the IC chip, wherein the heat-generating components include a plurality of wires of the IC chip and at least one device of the IC chip;
modifying or fabricating the physical embodiment of the computer readable model of the IC chip based on the computed total temperature elevation $\Delta T_i$ on the wire i.

2. The computer-implemented method of claim 1, wherein the spatial relationship defines one or more distances between the wire i and the heat-generating component and a wire-routing orientation of the wire i with respect to the heat-generating component.

3. The computer-implemented method of claim 2, wherein the computing of the temperature elevation $\Delta T$ on the wire i caused by the heat-generating component includes:
determining the wire-routing orientation of the wire i with respect to the heat-generating component, wherein the determining of the wire-routing orientation includes determining if the wire i and the heat-generating component are parallel to each other.

4. The computer-implemented method of claim 3, wherein the computing of the temperature elevation $\Delta T$ on the wire i caused by the heat-generating component includes:
based on a determination that the wire i and the heat-generating component are not parallel to each other, computing a plurality of local temperature elevations at different locations along a length of the wire i, wherein each of the plurality of local temperature elevations is caused by the heat-generating component; and
averaging values of the plurality of local temperature elevations to compute the temperature elevation $\Delta T$ on the wire i caused by the heat-generating component.

5. The computer-implemented method of claim 1 comprising:
estimating the temperature of the wire i based on a base temperature for the wire i and the total temperature elevation $\Delta T_i$, wherein the base temperature for the wire i
(i) is a predetermined uniform value that applies to all wires on the IC chip, or
(ii) is based on a temperature profile across the IC chip, the temperature profile being computed based on a finite element analysis of the IC chip in a chip-package-system (CPS) environment.

6. The computer-implemented method of claim 1, wherein the IC chip includes a plurality of layers stacked in a vertical direction, and wherein the computing of the decay profile of the heat-generating component includes:
using a finite element analysis to compute the decay profile, wherein the finite element analysis is based on a simulation structure that includes an element representing the heat-generating component (i) embedded within a low-K dielectric material, and (ii) located at a height in the simulation structure corresponding to that of a layer of the plurality of the layers in which the heat-generating component is included.

7. The computer-implemented method of claim 6, wherein the finite element analysis does not include an analysis of all components of the IC chip, wherein the simulation structure does not include an element representing the wire i, and wherein the simulation structure does not include elements representing other heat-generating components of the plurality of heat-generating components.

8. The computer-implemented method of claim 1, wherein the computing of the temperature of the heat-generating component during the operation of the IC chip includes:
based on a determination that the heat-generating component is a wire j of the plurality of wires, using a finite element analysis to compute a self-heating temperature of the wire j based on a current on the wire j during the operation of the IC chip, wherein the temperature of the heat-generating component is equal to the self-heating temperature.

9. The computer-implemented method of claim 8, wherein the IC chip includes a plurality of layers stacked in a vertical direction, wherein the finite element analysis is based on a simulation structure that includes an element representing the wire j (i) embedded within a low-K dielectric material, and (ii) located at a height in the simulation structure corresponding to that of a layer of the plurality of the layers in which the wire j is included, wherein the finite element analysis does not include an analysis of all components of the IC chip, wherein the simulation structure does not include an element representing the wire i, and wherein the simulation structure does not include elements representing other heat-generating components of the plurality of heat-generating components.

10. The computer-implemented method of claim 8 comprising:
based on a determination that the wire j is a signal wire of the IC chip, using a root-mean-squared (RMS) current in the computing of the self-heating temperature of the wire j; and
based on a determination that the wire j is a power or ground wire of the IC chip, using an average current on the wire j in the computing of the self-heating temperature of the wire j.

11. The computer-implemented method of claim 1, wherein the computing of the temperature of the heat-generating component during the operation of the IC chip includes:
based on a determination that the heat-generating component is a device:
computing the temperature of the device based on a predetermined temperature rise associated with the device during the operation of the IC chip; or
computing the temperature of the device based on a finite element analysis, wherein the finite element analysis is based on a simulation structure that includes a rectangular volume representing the device, and wherein the temperature of the device is based on a single self-heating temperature of the rectangular volume that is computed based on the finite element analysis.

12. The computer-implemented method of claim 11, wherein the finite element analysis is not used in computing self-heating temperatures for constituent components of the device.

13. The computer-implemented method of claim 11, wherein the IC chip includes a plurality of layers stacked in a vertical direction, and wherein the device is a front-end-of-line (FEOL) device included in a device layer of the IC chip that is stacked directly above a substrate layer of the IC chip.

14. The computer-implemented method of claim 13, wherein the FEOL device is a FinFET device or a planar field-effect transistor (FET) device.

15. The computer-implemented method of claim 1, wherein the computing of the total temperature elevation $\Delta T_i$ on the wire i is based on $$\Delta T_i = \sum_{j=1}^{n} \Delta T_j,$$

where $\Delta T_j$ is a temperature elevation on the wire i caused by a heat-generating component j, and n is a number of the plurality of heat-generating components, and wherein each of then heat-generating components is determined to cause a non-negligible temperature elevation on the wire i.

16. The computer-implemented method of claim 1, wherein the IC chip includes a Complementary Metal-Oxide-Semiconductor (CMOS) integrated circuit, a gallium nitride (GaN) integrated circuit, a photonic integrated circuit, a radio frequency integrated circuit (RFIC), a bipolar junction transistor (BJT) integrated circuit, or a power management integrated circuit (PMIC).

17. The computer-implemented method of claim 1, wherein the IC chip includes m layers stacked in a vertical direction, and wherein computing decay profiles for each of the heat-generating components includes:
performing a finite element analysis for a bottom layer of the m layers, wherein the performing of the finite element analysis includes:
generating a simulation structure including a thickness in the vertical direction that is equal to that of the IC chip, the simulation structure including (i) an element representing a heat-generating component at a height in the simulation structure that corresponds to that of the bottom layer in the m layers, and (ii) low-K dielectric material surrounding the element, and
computing a decay profile for the element by performing the finite element analysis using the simulation structure;
repeating the performing step for each layer of the m layers to generate m decay profiles; and
associating each of the heat-generating components of the IC chip with a single decay profile of the m decay profiles, wherein the associating is based on a layer of the m layers in which the heat-generating component is included.

18. The computer-implemented method of claim 1, wherein the computing of the temperature for each of the heat-generating components includes:
based on a determination that the heat-generating component is a wire j, computing a temperature rise on the wire j due to self-heating based on a root-mean-squared (RMS) current on the wire j; and
based on a determination that the heat-generating component is a front-end-of-line (FEOL) device, computing a temperature rise on the FEOL device based on a predefined value or based on a finite element analysis.

19. The computer-implemented method of claim 1, further comprising:
computing an allowable current density in the wire i, the computing of the allowable current density comprising:
estimating a temperature of the wire i based on a base temperature for wires of the IC chip and the total temperature elevation $\Delta T_i$; and
computing the allowable current density in the wire i based on a desired mean-time-to-failure (MTTF) of the wire i and the estimated temperature of the wire i.

20. A system for estimating a temperature of a wire i of an integrated circuit (IC) chip having a plurality of heat-generating components, the system comprising:
a processing system; and
a memory in communication with the processing system, wherein the processing system is configured to execute steps comprising:
accessing at least a portion of a computer readable model comprising model data describing the IC chip comprising the plurality of heat generating components and the wire i;
computing, based on the model data, for each of the heat-generating components:
a temperature of the heat-generating component during operation of the IC chip;
a decay profile that defines a thermal coupling from the heat-generating component to wires of the IC chip as a function of distance from the heat-generating component; and
a temperature elevation $\Delta T$ on the wire i caused by the heat-generating component, the temperature elevation $\Delta T$ being computed based on (i) the temperature of the heat-generating component, (ii) the decay profile of the heat-generating component, and (iii) a spatial relationship between the wire i and the heat-generating component; and computing a total temperature elevation $\Delta T_i$ on the wire i by summing the temperature elevation $\Delta T$ of each of the heat-generating components of at least the portion of computer readable model of the IC chip, wherein the heat-generating components include a plurality of wires of the IC chip and at least one device of the IC chip.

21. A non-transitory computer-readable storage medium for estimating a temperature of a wire i of an integrated circuit (IC) chip having a plurality of heat-generating components, the computer-readable storage medium comprising computer-executable instructions which, when executed, cause a processing system to execute steps comprising:

accessing at least a portion of a computer readable model of the IC chip comprising the plurality of heat generating components and the wire i extracting, from the at least a portion of a computer readable model of the IC chip, model data describing one or more physical characteristics of a physical embodiment of the model of the IC chip;

computing, based on the model data, for each of the heat-generating components:
  a temperature of the heat-generating component during operation of the IC chip;
  a decay profile that defines a thermal coupling from the heat-generating component to wires of the IC chip as a function of distance from the heat-generating component; and
  a temperature elevation $\Delta T$ on the wire i caused by the heat-generating component, the temperature elevation $\Delta T$ being computed based on (i) the temperature of the heat-generating component, (ii) the decay profile of the heat-generating component, and (iii) a spatial relationship between the wire i and the heat-generating component;

computing a total temperature elevation $\Delta T_i$ on the wire i by summing the temperature elevation $\Delta T$ of each of the heat-generating components of at least the portion of computer readable model of the IC chip, wherein the heat-generating components include a plurality of wires of the IC chip and at least one device of the IC chip; and modifying or fabricating the physical embodiment of the computer readable model of the IC chip based on the computed total temperature elevation $\Delta T_i$ on the wire i.

22. The system for estimating a temperature of a wire i of an integrated circuit (IC) chip having a plurality of heat-generating components of claim 20, wherein the processing system is further configured to execute steps comprising:

extracting, from the at least a portion of a computer readable model of the IC chip, model data describing one or more physical characteristics of a physical embodiment of the model of the IC chip, wherein the computing is based at least in part on the model data.

23. The system for estimating a temperature of a wire i of an integrated circuit (IC) chip having a plurality of heat-generating components of claim 22, wherein the processing system is further configured to execute steps comprising:

modifying or fabricating the physical embodiment of the computer readable model of the IC chip based on the computed total temperature elevation $\Delta T_i$ on the wire i.

* * * * *